United States Patent [19]

Alsenz et al.

[11] Patent Number: 4,654,663

[45] Date of Patent: Mar. 31, 1987

[54] ANGULAR RATE SENSOR SYSTEM

[75] Inventors: Evert C. Alsenz, Long Beach; William F. Juptner, Laguna Beach; David F. Macy, Mission Viejo, all of Calif.

[73] Assignee: Piezoelectric Technology Investors, Ltd., Laguna Hills, Calif.

[21] Appl. No.: 321,964

[22] Filed: Nov. 16, 1981

[51] Int. Cl.⁴ .............................................. C08C 19/00
[52] U.S. Cl. .................................. 340/870.3; 73/505; 73/517 AV; 310/360; 331/156
[58] Field of Search ......................... 340/870.3, 870.37; 324/61 R; 73/505, 517 AV, 517 A; 331/156; 310/360, 370; 74/5.6 D

[56] References Cited

U.S. PATENT DOCUMENTS

| 2,683,247 | 7/1954 | Wiley . |
| 3,127,775 | 4/1964 | Hansen . |
| 3,141,100 | 7/1964 | Hart . |
| 3,143,889 | 8/1964 | Simmons ............................. 73/505 |
| 3,206,986 | 9/1965 | Christensen . |
| 3,258,617 | 6/1966 | Hart ..................................... 73/505 |
| 3,269,192 | 8/1966 | Southworth et al. ......... 73/517 AV |
| 3,307,409 | 3/1967 | Newton ............................... 73/505 |
| 3,319,472 | 5/1967 | Reefman ...................... 73/517 AV |
| 3,391,547 | 7/1968 | Kingston ...................... 340/870.37 |
| 3,465,597 | 9/1969 | Riordan et al. ............... 73/517 AV |
| 3,520,195 | 7/1970 | Tehon ................................... 73/505 |
| 3,656,354 | 4/1972 | Lynch . |
| 3,678,762 | 7/1972 | Denis . |
| 3,680,391 | 3/1972 | Denis . |
| 3,839,915 | 10/1974 | Schlitt ................................. 73/505 |
| 3,961,318 | 6/1976 | Farrand et al. ................ 340/870.37 |
| 4,019,391 | 4/1977 | Ljung . |
| 4,263,546 | 4/1981 | Morris ........................... 340/870.37 |
| 4,429,248 | 1/1984 | Chuang ............................... 310/348 |
| 4,479,098 | 10/1984 | Watson . |

FOREIGN PATENT DOCUMENTS

| 82306121 | 8/1983 | European Pat. Off. . |
| 2532042 | 2/1976 | Fed. Rep. of Germany . |
| 2845008 | 4/1980 | Fed. Rep. of Germany ........ 73/517 AV |
| 611011 | 10/1948 | United Kingdom . |
| 618328 | 2/1949 | United Kingdom . |
| 730783 | 6/1955 | United Kingdom . |
| 827860 | 2/1960 | United Kingdom . |
| 861436 | 2/1961 | United Kingdom . |
| 1304496 | 1/1973 | United Kingdom . |
| 1455046 | 11/1976 | United Kingdom . |
| 1540279 | 2/1979 | United Kingdom . |
| 2061502A | 5/1981 | United Kingdom . |
| 2111209A | 6/1983 | United Kingdom . |

OTHER PUBLICATIONS

R. E. Barnaby, et al., "General Theory and Operational Characteristics of the Gyrotron Angular Rate Tachometer,": Nov. 1953, pp. 31–36, Aeronautical Engineering Review.

List Continued on next page.

Primary Examiner—John W. Caldwell, Sr.
Assistant Examiner—Michael F. Heim
Attorney, Agent, or Firm—Knobbe, Martens, Olson & Bear

[57] ABSTRACT

An angular rate sensor system is disclosed, consisting of a balanced resonant sensor. The sensor consists of a tuning fork of a piezoelectric material, preferably of quartz. The tines of the tuning fork are caused to vibrate electromechanically, for example, by impressing an alternating voltage on a pair of electrodes on each tine. This will cause the tines to vibrate. Any component of angular motion around the axis of the sensor causes a cyclic deflection of the tines at right angles to the normal driven vibration of the tines. If the rotational input to the handle of the sensor is applied through a torsion element, the resulting tine deflection is directed to cyclically rotate the entire sensor along the input/output axis. This deflection can be used for changing the capacitance of a capacitance bridge, or for generating an electric signal, due to the piezoelectric effect resulting from the deflection. Finally, the output signal may consist of a frequency-modulated signal or an optical pickup may be used. The system may take various forms, including one, two, four, or eight tuning forks forming a unitary system.

42 Claims, 14 Drawing Figures

OTHER PUBLICATIONS

J. Lyman, "A New Space Rate Sensing Instrument," Nov. 1953, pp. 21-30, Aeronautical Engineering Review.

C. T. Morrow, "Zero Signals in the Sperry Tuning Fork Gyrotron," May 1955, pp. 581-585, J of Acoustical Society of America.

G. C. Newton, Jr., "Comparison of Vibratory and Rotating-Wheel Gyroscopic Rate Indicators," Jul. 1960, pp. 143-150, Part II, Transactions of the American Institute of Electronics Engineers (AIEE).

G. C. Newton, Jr., "Theory and Practice in Vibratory Rate Gyros", Jun. 1963, pp. 95-99, Control Engineering.

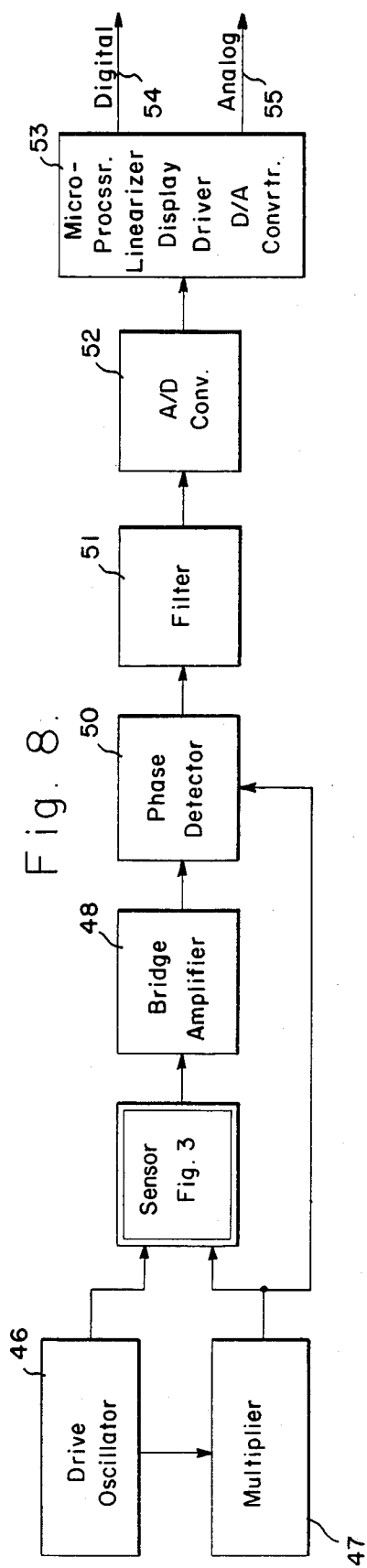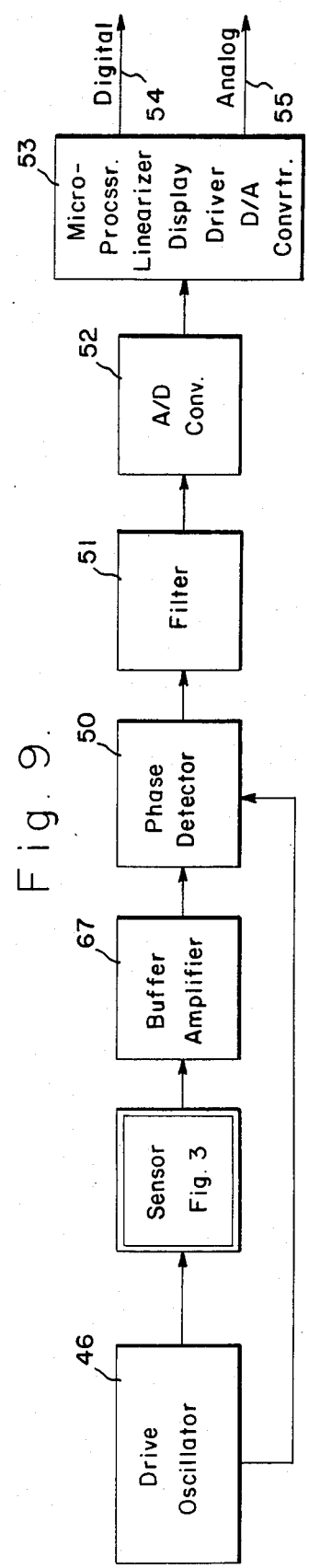

ANGULAR RATE SENSOR SYSTEM

BACKGROUND OF THE INVENTION

The angular rate of motion of a craft is an essential input for all navigational and inertial guidance systems. Such systems are used conventionally for aircraft, spacecraft, ships, or missiles. The sensing of the angular rate of motion is presently accomplished by means of a gyroscope.

However, gyroscopes have various disadvantages. They must be built to extremely high accuracies and may have drift rates of fractions of a degree per hour. Due to the expense of building them, they are very costly; they are physically large and heavy. They must be frequently and precisely maintained, for the reason that critical movable elements such as bearings may change with time. They may also be damaged by even low levels of shock and vibration. This, in turn, may cause an increase in the drift rate of unknown size, occurring at unknown times.

Because gyroscopes are sensitive to the effects of shock and vibration, they frequently have heavy mounting configurations to protect them, which also are expensive.

SUMMARY OF THE INVENTION

It will accordingly be obvious that it is desirable to replace a gyroscope by some other device which is less expensive and which is capable of measuring angular rates, thereby measuring the attitude of a vehicle or craft. In accordance with the present invention, this is accomplished by a balanced resonant sensor. Such a sensor is represented, in accordance with the present invention, by a tuning fork. The tuning fork should be substantially mechanically temperature-stable, having low internal friction and following Hook's Law. According to Hook's Law, the strain of an elastic body is proportional to the stress to which the body is subjected by the applied load (within elastic limits); the elastic body is to return to its original state when the stress is removed. Preferably but not necessarily, the tuning fork consists of quartz. However, other piezoelectric materials may be used, such as synthetic crystals; for example ethylene diamine tartrate (EDT), dipotassium tartrate (DKT), or ammonium dihydrogen phosphate (ADP). Non-piezoelectric materials may be used with a piezoelectric drive.

Preferably the tuning fork consists of an insulating material such as quartz, but it is also possible to utilize conductive materials, in which case the tines of the tuning fork must be excited electromagnetically; that is, by stationary coils and a magnetic system on the tines.

The tuning fork consists of a pair of tines disposed parallel to each other and capable of vibrating. They are interconnected by an output shaft or handle, from which the output signal may be derived. The output signal is simply representative of the input angular rate of motion to which the system is subjected, which cases a deflection at right angles in the direction of vibration. An optical or frequency-modulated output signal may also be obtained.

The output signal may be obtained by coupling four capacitors to the tines or output shaft, or it may be obtained piezoelectrically, resistively, or optically. Measurable input rates of the order of ten degrees per hour of the sensor of the invention are sufficiently low for use as a magnetically corrected directional reference and as a gravitationally corrected vertical attitude reference. If input rates of 0.1 degree per hour are measurable, the system is usable for inertial quality references such as a self-contained inertial guidance system.

The novel features that are considered characteristic of this invention are set forth with particularity in the appended claims. The invention itself, however, both as to its organization and method of operation, as well as additional objects and advantages thereof, will best be understood from the following description, when read in connection with the accompanying drawings.

BRIEF DESCRIPTION OF THE DRAWINGS

FIG. 8 is a block diagram of the output circuit for the bridge circuit of FIG. 7;

FIG. 9 is a block diagram similar to that of FIG. 8 but illustrating a piezoelectric output such as obtainable with the electrode configuration of FIG. 13;

DETAILED DESCRIPTION

Figure 1:
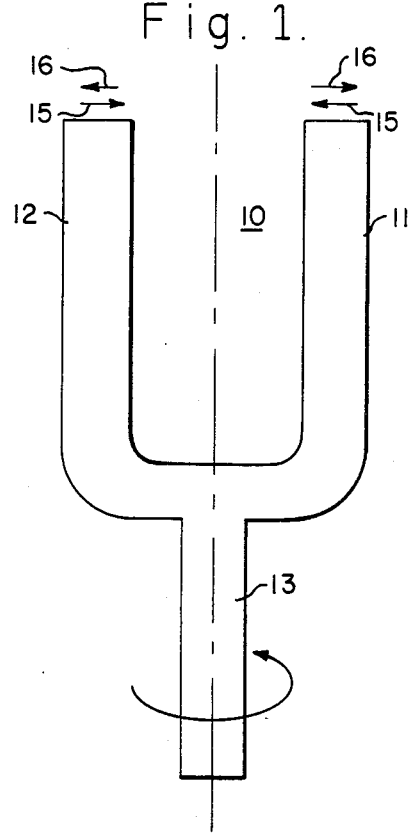
FIG. 1 is a plan view of a tuning fork for explaining the principles of the present invention.
Figure 2:
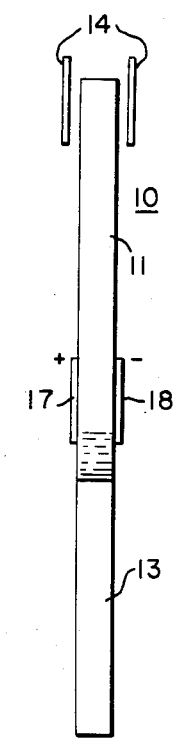
FIG. 2 is a side elevational view of the tuning fork of FIG. 1 and illustrating two pairs of electrodes for deriving an output signal.

Referring now to the drawings, and particularly to FIGS. 1 and 2, there is illustrated a simple tuning fork to explain the basis of the operation of the present invention. As set forth above, the tuning fork 10 is of a piezoelectric material such a certain synthetic crystals, and preferably of quartz. Thus, FIGS. 1 and 2 illustrate a tuning fork 10 having two tines 11 and 12 and an output shaft or handle 13. The tines may be caused to vibrate by applying an electric field thereto, such as will be explained in connection with FIGS. 4 to 6. A pair of electrodes 14, which are spaced from the free ends of each of the tines such as 11, are shown in FIG. 2 to provide a capacitive output. The tines are now vibrated toward each other, as shown by arrows 15, and away from each other on the next-half-cycle, as shown by arrows 16. Therefore, the tuning fork represents a balanced resonant circuit, because the tines 11, 12 are balanced.

The electrical output may be obtained by another pair of electrodes 17, 18, which may be directly applied to the area between the tines 11, 12 and the output shaft 13. The two electrodes 17, 18 assume different polarities due to the deflection of the tuning fork 10 caused by angular motion of the system. Once the angular motion is applied, the time derivative; that is, the angular rate of motion, may readily be obtained.

Assuming, now, a tuning fork having a distance of 0.5 cm from the center of motion to the end of the tine 11, or a distance of 0.2 cm for the portion of the tine covered by the electrode 14, a distance of 0.4 cm from the center of motion to the center of the electrode 14, a width of each tine of 0.05 cm, a thickness of each tine of 0.005 cm, while half the amplitude of vibration is 0.00025 cm and the drive frequency is 10 KHz, while the specific density of the quartz is 2.6 gm/cm$^3$. With these assumptions, the angular momentum H may be calculated as follows:

$$H = 6.53 \times 10^{-4} \text{ gm cm}^2/\text{sec} \quad (1)$$

Similarly, the torque T may be calculated as follows:

$$T = 1.89 \times 10^{-7} \text{ gm cm} \quad (2)$$

Finally, the deflection of the tines is:

$$Y = 1.62 \times 10^{-7} \text{ cm} \quad (3)$$

It can now be shown that the effect of increasing the size of the tuning fork, but not its width, is N, which goes with the fifth power of an increase of the dimensions. Hence, the following table can be calculated:

TABLE 1

| N | 1 | 2 | 3 | 4 | 5 |
|---|---|---|---|---|---|
| $N^5$ | 1 | 32 | 243 | 1024 | 3125 |
| $Y_N$ (in cm) | $1.62 \times 10^{-7}$ | $5.18 \times 10^{-6}$ | $3.94 \times 10^{-5}$ | $1.66 \times 10^{-4}$ | $3.13 \times 10^{-4}$ |

Hence, it will be evident from Table 1 that an increase of the size of the tuning fork will cause a considerable increase in the deflection of the tine.

Referring now generally to FIGS. 3 through 9 and particularly to FIGS. 3 through 6, there is illustrated a preferred embodiment of the present invention. This embodiment includes two tuning forks, the two axes of which are disposed spaced from and parallel to the central axis. Thus, the first tines 20, 20' of the pair of tuning forks is made up of a single section 22. The section 22 is divided into two portions which make up the two tuning forks 20 and 21 by a gap 23, which, however, leaves a small bridge 24 to interconnect the two portions 20, 21. The other section 22' is exactly symmetrical with the section 22 and provides the other tines 20', 21' of the two tuning forks.

The two ends of each of the two sections 22 and 22' are interconnected by an interconnecting member 25, 25'. The member 25 is separated from the two sections 22 and 22' by two gaps 26 and 26'. The other interconnected member 25' is similarly separated from the two sections 22 and 22'.

Figure 4:
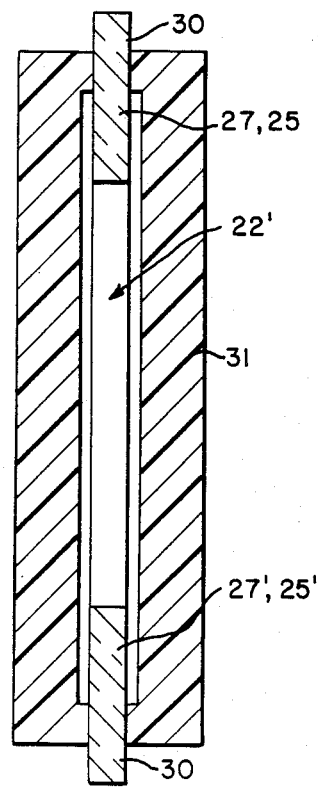
FIG. 4 is a cross-section view of the embodiment of FIG. 3 and showing a casing surrounding the tuning fork.

The two interconnecting members 25 and 25' form the output shaft. They are each connected by a small bridge portion 27 and 27' with a surrounding frame 30, separated from the two sections 22 and 22'. As shown in FIG. 4, the tuning fork may be surrounded by a casing 31. Thus, the portion 20, 20' form one pair of tines and the portion 21, 21' form the other tuning fork.

Figure 5:
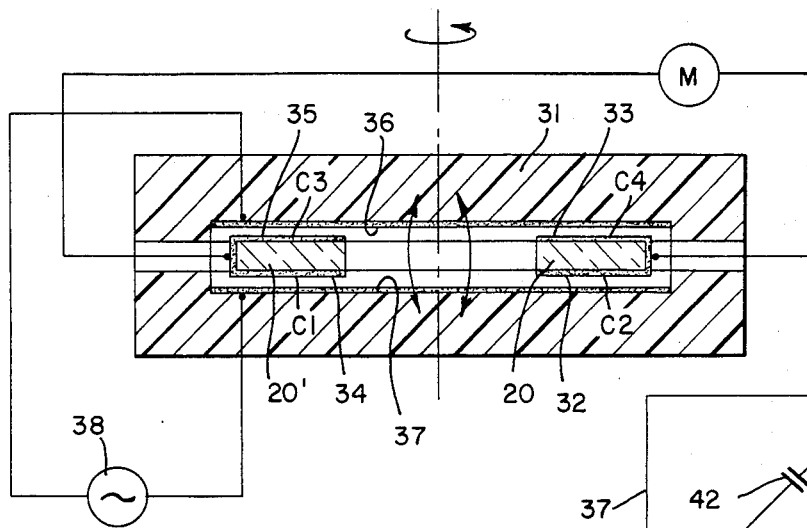
FIG. 5 is a cross-sectional view on line 5—5 of FIG. 3, also showing the casing and illustrating a capacitive output which may be used in a bridge circuit.

FIG. 5 illustrates the electrodes which may be provided at the ends of a pair of tines 20, 20' of a tuning fork. The tine 20 is provided on opposite sides with a single electrode 32, 33. Similarly, the tine 20' is provided with one electrode 34, 35. One of the inner surfaces of the casing 31 is provided with a similar electrode 36, while the other, or opposite, inner surface bears an electrode 37.

A sense oscillator 38 is connected to the two inner electrodes 36, 37 on the casing 31. Hence, a capacitance 40 is formed between electrodes 37 and 32. Another capacitance 41 is formed between the electrodes 33 and 36. A third capacitance 42 is formed between the electrodes 34, 37, and the fourth capacitance 43 is formed between the electrodes 35 and 36.

Figure 6:
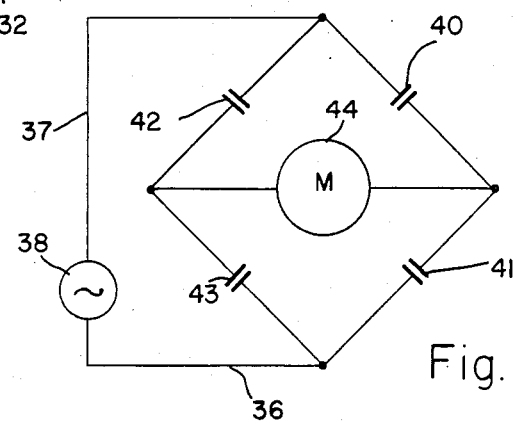
FIG. 6 illustrates the capacitive bridge obtained with the electrode arrangement of FIG. 5.

The output of the bridge circuit of FIG. 6 may be obtained by the meter 44.

The output circuit of the capacitance bridge of FIG. 6 is shown in FIG. 8. The drive oscillator 46 may be multiplied to some higher frequency by a multiplier 47. The drive oscillator is applied to the sensor of FIG. 3. A bridge amplifier 48 may be used to amplify the signal obtained from meter 44. This is followed by a phase detector 50 which uses a reference phase from the multiplier 47, coupled to the drive oscillator 46. The phase detector is followed by a filter 51 and an A/D converter 52 which feeds a microprocessor, linearizer, display driver and D/A converter 53. Hence, the output signal may either be obtained from the digital output lead 54 or the analog output lead 55 and may be applied to a suitable display device.

Figure 3:
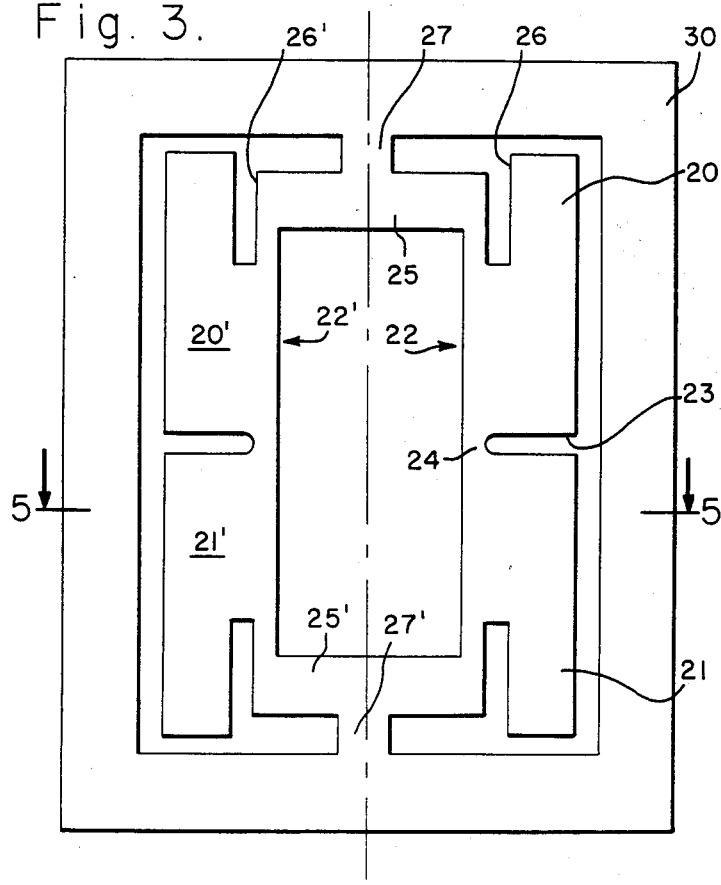
FIG. 3 is a plan view of a preferred embodiment of the present invention and including two tuning forks, the casing being omitted.
Figure 7:
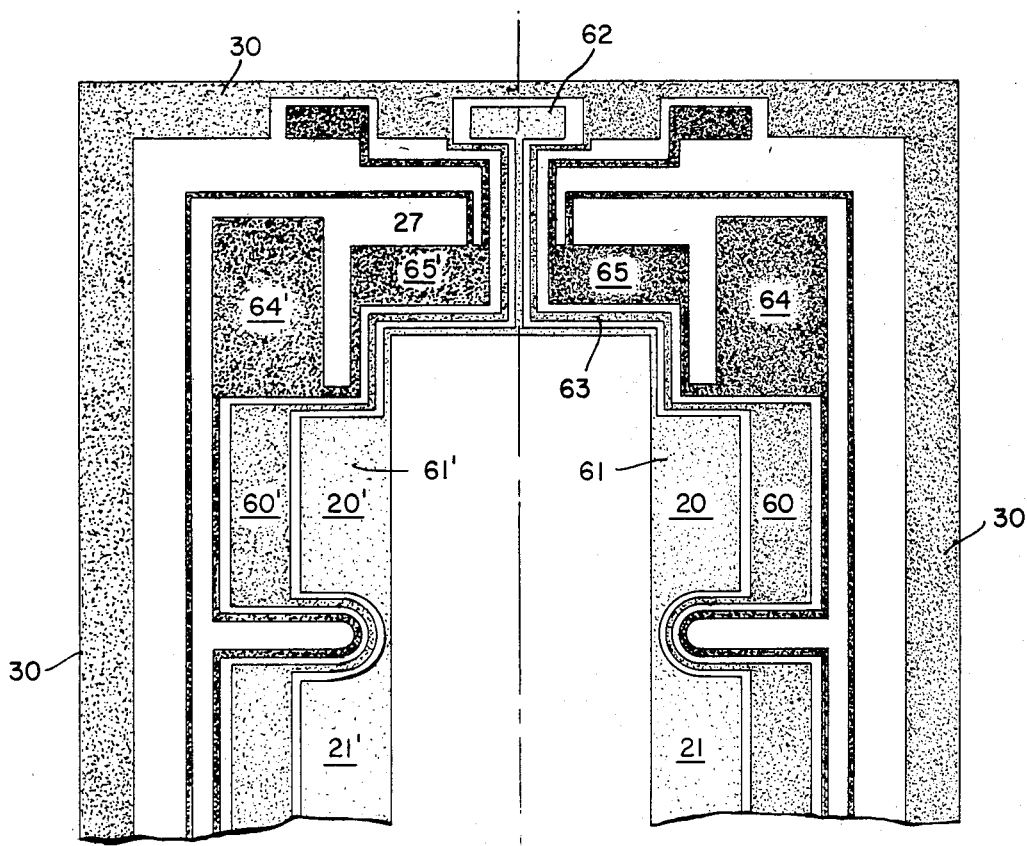
FIG. 7 is a plan view on enlarged scale of a portion of the sensor of FIG. 3 and illustrating both the drive and the output electrodes, including the output leads for the sensor of FIG. 3.

Reference is now made to FIG. 7, which shows, on enlarged scale, a portion of the sensor of FIG. 3 and the electrodes therefor. A pair of drive electrodes 60 and 61 is disposed on the tine 20. The two drive electrodes are connected respectively to leads 62 and 63, which in turn are connected to the drive oscillator. The two electrides are slightly spaced from each other to set up an electrical field to cause the tine to vibrate. The other tine 20' is also provided with similar electrodes 60' and 61', which are also connected to output leads 62' and 63', leads 62 and 62' being tied together.

A pick-up electrode 64 is connected to another pick-up electrode 65, also disposed on the tine 20. The output electrodes 64 and 65 are connected to lead 66 and to the frame 30. The other tine 20' is provided with similar output electrodes.

It will be noted that the output electrodes 64 and 64' are directly disposed on the tine, to provide a capacitive output, as shown in FIG. 6. It will be understood that one of the output leads such as 62, 63, may be grounded.

Figure 13:
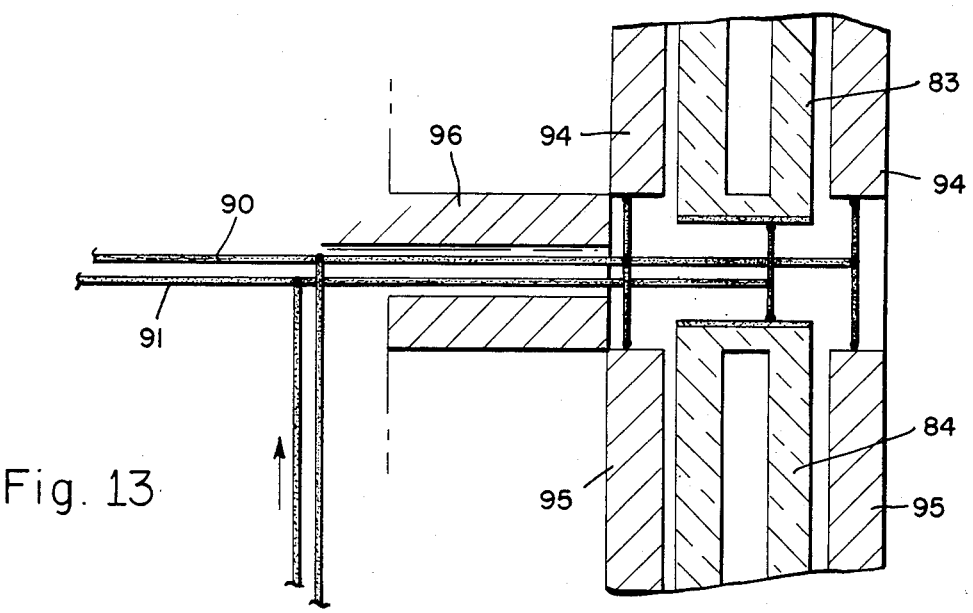
FIG. 13 is a schematic view on enlarged scale of a portion of the sensor of FIG. 12 and illustrates the drive electrodes as well as one of the pick-up electrodes.

A piezoelectric output circuit for the electrodes of FIGS. 3 and 13 are shown in FIG. 9. Again, the drive oscillator 46 energizes the balanced sensor of FIGS. 3 and 13 via the leads 90 and 91. In this case a piezoelectric voltage appears at electrodes 96 and the corresponding hidden electrode, due to the strain in the crystal due to the tine deflection. A buffer amplifier 67 follows the sensor of FIG. 3 or 13, which in turn is followed by a phase detector 50, filter 51, A/D converter 52 and D/A converter 53. This will, again, provide either a digital or an analog signal on output leads 54, 55. It should be noted that the gaps such as 23, 26 (see FIG. 3) make it possible to increase the mass of the tines and hence to provide a lower resonant frequency. The resonant frequency of the tine in the direction of the output deflection may be made to equal the frequency of the drive signal. Thus, the resonant frequencies depend on the mass of the tines such as 20, 21, and the dimensions of the gaps 23, 26. Hence, these values can be adjusted at will.

Figure 10:
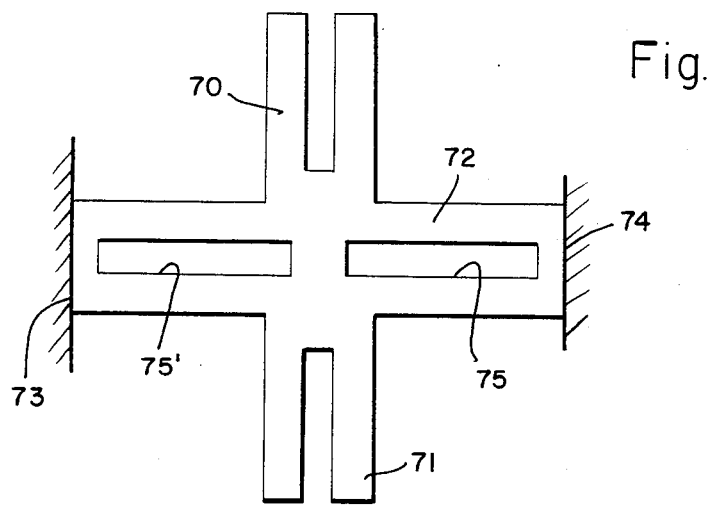
FIG. 10 is a plan view of another angular rate sensor consisting of two tuning forks disposed in line and normal to the output shaft.
Figure 11:
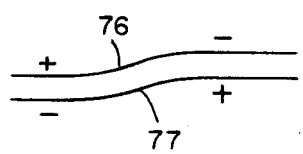
FIG. 11 illustrates schematically the voltage developed at the output shaft due to the mechanical deformation.

Referring now to FIGS. 10 and 11, there is illustrated another configuration of the sensor in accordance with the present invention. As clearly shown in FIG. 10, the sensor comprises two tuning forks 70 and 71, disposed on a common axis at right angles to the output shaft 72.

The output shaft 72 is preferably fixed between two walls 73, 74. Preferably the output shaft 72 is provided with two symmetrical substantially rectangular openings 75' primarily to reduce the weight of the output shaft and to reduce its stiffness. As a result, the resonant frequency of the output shaft 72 is reduced. Hence, the output shaft 72 may also serve as a pair of tuning forks.

FIG. 11 illustrates the polarity of the output voltage shown on curves 76, 77; that is, on opposite sides of the output shaft 72.

Figure 12:
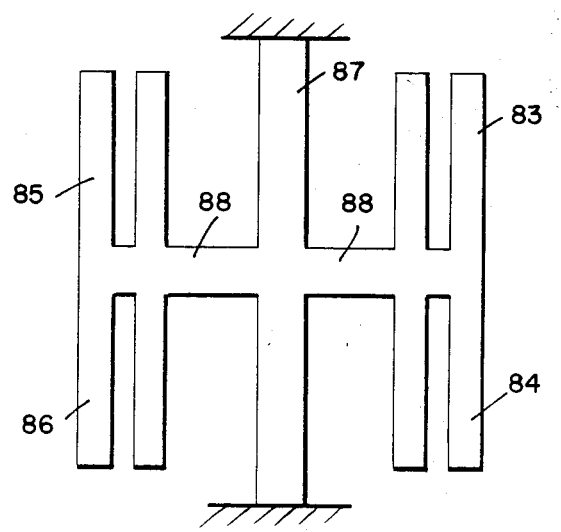
FIG. 12 is another embodiment of the rate sensor of the invention providing four tuning forks, each pair of tuning fork being in line, the two pairs being disposed parallel to the output shaft.

FIGS. 12 and 13 show another configuration of a sensor of the invention, providing two pairs of tuning forks. As clearly shown in FIG. 12, there is provided a first pair of tuning forks 83, 84 having a common axis, and a second pair of tuning forks 85, 86 also having a common axis, the two axes being spaced from the output shaft 87. The two pairs of tuning forks are connected to the output shaft 87 by connecting member 88.

FIG. 13 shows, by way of example, how the tuning forks can be driven. The input leads 90, 91 from the drive oscillator are connected so that input lead 91 goes to tuning forks 83 and 84. At the same time the upper casing 94 is energized from the input lead 90, as is the lower casing 95, thus generating an electric field between the casings 94, 95 and tuning forks 83, 84.

One of the output or pick-up electrodes 96 may be disposed on the interconnecting portion 88. The other output electrode is behind the electrode 96 and is not visible in FIG. 13.

Figure 14:
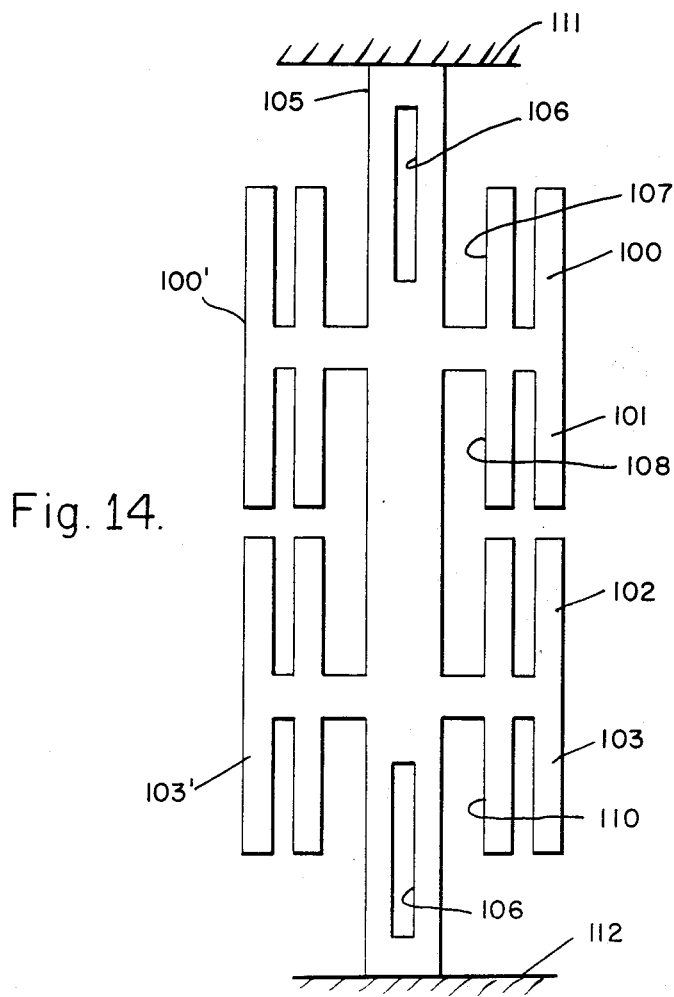
FIG. 14 is a plan view of still another embodiment of the sensor of the invention, featuring eight tuning forks, four being disposed on the same axis and the axes of the two sets of tuning forks being disposed parallel to the axis of the output shaft.

The sensor of FIG. 14 is characterized by two pairs of four tuning forks each. Thus, a first set of tuning forks 100, 101, 102, and 103 has a common axis. The second set of four tuning forks 100' through 103' also has a common axis, but is spaced from that of the output shaft 105. The output shaft 105 may again be provided at each end with a rectangular relief or cutout 106 to reduce its weight and its stiffness and, hence, its resonant frequency. The tuning forks, such as 100 to 103, are separated from the output shaft by large gaps 107, 108, and 110. The output shaft 105 may again be disposed between two walls 111 and 112.

The output shaft 105 may be pretwisted to provide a phase shift; that is, prestressed, thereby to detect the direction of the angular motion in addition to its rate. Hence the output shaft 105 may be used to provide an output frequency that may be higher than the driving frequency. The same is true of the output shaft 72 of FIG. 10.

It should be noted that the electrodes preferably consist of a gold plating. By means of laser trimming, the two tines of each tuning fork may be balanced; that is, the laser may remove an appropriate portion of the electrode of one tine. This will increase the Q of the circuit.

There has been disclosed an angular rate sensor comprising basically a tuning fork energized by a drive oscillator. Angular motion of the system will cause a deflection of the output shaft at right angles to the direction of vibration. This deflection can be measured either by a capacitance effect, by a resistive effect, or by an electric voltage generated by the piezoelectric effect. Also, a frequency-modulated output signal may be obtained, or an optical pick-up may be used. Various configurations have been shown providing a multiplicity of tuning forks. The preferred arrangement permits control of the frequency of the output signal with respect to the vibration of the sensor. Such an angular rate sensor can be manufactured by semiconductor techniques much more inexpensively than a conventional gyroscope. In addition to being less expensive to manufacture, its accuracy should be sufficient for most practical applications, as directional and attitude references with magnetically or gravitationally corrected applications and even for inertial quality references used as a self-contained inertial guidance system.

What is claimed is:

1. An angular rate sensor system comprising:
   (a) a tuning fork formed from a single crystal of piezoelectric material, said tuning fork having two tines and a common shaft disposed in a plane, said common shaft serving as an output shaft, said tuning fork providing a balanced resonant sensor responsive solely to a component of angular motion about the longitudinal axis of the output shaft, causing a torsional deflection of said output shaft
   (b) driving means coupled to said tines for causing them to vibrate at a drive frequency
   (c) electrode means, responsive to piezoelectric signals, positioned on said tuning fork for sensing said piezoelectric signals representative of the angular rate of motion about said axis to which said system is subjected and
   (d) output means including a phase detector for said piezoelectric signals and means for generating an output signal indicative of the angular rate of motion.

2. A system as defined in claim 1 wherein said driving means includes a drive oscillator, first electrodes connected to each of said tines and second electrodes spaced from said first electrodes, said electrodes being electrically coupled to said oscillator.

3. A system as defined in claim 2, wherein said output means includes a pair of output electrodes on said output shaft for generating an electrical signal representative of the stress within said shaft due to the angular motion, said pair of output electrodes being electrically coupled to said phase detector.

4. A system as defined in claim 3 wherein said output electrodes are connected to said phase detector, and said phase detector is connected to said drive oscillator to derive said output signal.

5. An angular rate sensor comprising:
   (a) a single crystal of quartz having two substantially parallel sections, each of said sections being provided at its center with a first gap, leaving a small bridge between the two portions of each section, each portion forming a tine of a tuning fork;

(b) said sections being interconnected at each end by an interconnecting member forming an output shaft, each of said members being separated from its associated section by a second gap leaving a small bridge between each member and its associated section, said gaps controlling said tine inertia and frequency of said sensor, whereby the dimensions of said gaps and of said portions and the masses of said sections, portions and members determine the resonant frequency of said tines and the frequency of an output signal indicative of the angular rate of motion to which said sensor is subjected.

6. A sensor as defined in claim 5, wherein a casing is provided, a pair of drive electrodes being provided on each of said tines, and output electrodes on each of said tines for deriving an electric signal indicative of the deflection of said tines, said casing being spaced from said electrodes.

7. A sensor as defined in claim 6 wherein a pair of inner electrodes is provided on the inner surface of said casing for each of said tuning forks, said inner electrodes being coupled to a drive oscillator.

8. A sensor as defined in claim 6 wherein said casing is etched to receive said electrodes.

9. A system as defined in claim 3 wherein said output shaft is pretwisted to generate an output signal representative of the direction of the angular motion.

10. A system as defined in claim 9 wherein said output shaft is provided with at least one substantially rectangular cut-out to reduce its weight and its stiffness.

11. An angular rate sensor system comprising:
(a) a single crystal resonant structure exhibiting piezoelectric properties, said structure having at least two vibrating elements, each of said vibrating elements comprising two tines and a common shaft, said tines and shaft being disposed in a plane, said common shaft serving as an output shaft, said single crystal structure providing a balanced resonant sensor responsive solely to a component of angular motion about the longitudinal axis of said output shaft, causing a torsional deflection on said output shaft
(b) driving means coupled to said tines for causing them to vibrate at a drive frequency and
(c) output means coupled to said output shaft for detecting a piezoelectric signal representative of the angular rate of motion about said axis to which said system is subjected.

12. A system as defined in claim 11 wherein said vibrating elements are symmetrically arranged and spaced from and substantially parallel to said output shaft.

13. An angular rate sensor system as defined in claim 1, wherein the output means comprises at least one electrode which is sensitive to voltage levels in the tuning fork, and which produces a signal which changes as a function of the voltage in the tuning fork.

14. An angular rate sensor system as defined in claim 13, wherein said at least one electrode comprises a plurality of electrodes positioned in laterally spaced relationship on the output shaft.

15. An angular rate sensor system as defined in claim 13, wherein a casing is provided, a pair of drive electrodes being provided on opposing sides of said tines, and output electrodes on each of said tines for deriving a signal indicative of the deflection of said tines, said casing being spaced from said electrodes.

16. An angular rate sensor system as defined in claim 15, wherein a pair of inner electrodes is provided on the inner surface of said casing for each of said tuning forks, said inner electrodes being coupled to a drive oscillator, whereby a capacitive output is obtained from said inner and output electrodes, the capacitances between said inner and output electrodes being connected in a bridge to derive an output signal representative of the deflection of said tines.

17. An angular rate sensor system as defined in claim 15, wherein said casing is etched to receive said electrodes.

18. An angular rate sensor system as defined in claim 11, wherein the output means are positioned on the output shaft so as to respond to changes in voltage levels of the resonant structure, thereby providing a signal representative of the angular motion about the longitudinal axis of the output shaft.

19. An angular rate sensor system as defined in claim 18, wherein the output means comprise electrodes positioned in laterally spaced relationship on the output shaft.

20. An angular rate sensor system as defined in claim 11, wherein a casing is provided, a pair of drive electrodes being provided on opposing sides of said tines, and output electrodes on each of said tines for deriving a signal indicative of the deflection of said tines, said casing being spaced from said electrodes.

21. An angular rate sensor system as defined in claim 20, wherein a pair of inner electrodes is provided on the inner surface of said casing for each of said turning forks, said inner electrodes being coupled to a drive oscillator, whereby a capacitive output is obtained from said inner and output electrodes, the capacitances between said inner and output electrodes being connected in a bridge to derive an output signal representative of the deflection of said tines.

22. An angular rate sensor system as defined in claim 21, wherein said casing is etched to receive said electrodes.

23. An angular rate sensor comprising:
a single crystal of piezoelectric material having at least two tines symmetrically disposed in a plane about a common shaft, which are vibrated in first and second opposing directions in said plane, and
electrodes mechanically connected to said single crystal for piezoelectrically measuring stresses caused by the movement of said tines in third and fourth opposing directions orthogonal to said plane caused by rotation of said vibrated tines.

24. An angular rate sensor as defined in claim 23 wherein said tines are vibrated by applying oscillating voltages to said tines.

25. An angular rate sensor as defined in claim 23, wherein said electrodes sense piezoelectric signals generated within said single crystal by said stresses.

26. The angular rate sensor as defined in claim 23 wherein said electrodes are mechanically connected to said common shaft.

27. An angular rate sensor comprising:
a single crystal of piezoelectric material formed as first and second tines disposed symmetrically about a common axis
first and second sets of electrodes attached to said first and second tines of said single crystal of piezoelectric material for subjecting said tines to oscillating voltages, thereby causing said tines to vibrate in a plane and a third set of electrodes attached to said single crystal of piezoelectric material to detect piezoelectric voltages generated by said material caused by movement of said tines in directions orthogonal to said plane when said material is rotated.

28. A gyroscope comprising:

a single crystal of piezoelectric material having first and second tines a driver for piezoelectrically driving said tines to move said tines along first paths and a sensor for sensing rotation of said piezoelectric material by piezoelectrically detecting stress caused by the tendency of said tines to continue moving along said first paths.

29. A gyroscope as defined in claim 28, wherein said tines comprise tines of at least one tuning fork.

30. A gyroscope as defined in claim 29, wherein the tines are connected to a common shaft, and wherein said sensor detects stress in said common shaft.

31. A gyroscope as defined in claim 29 wherein two tuning forks are provided, said tuning forks being symmetrically arranged and disposed substantially normal to an output shaft, said output shaft being disposed between two substantially fixed elements, and wherein said sensor detects stress in said output shaft.

32. A gyroscope as defined in claim 29 wherein four tuning forks are provided, a first pair of said tuning forks being disposed along a first common axis, a second pair of said tuning forks being disposed along a second common axis, each of said axes being disposed parallel to an output shaft, and said output shaft being disposed between two substantially fixed elements.

33. A gyroscope as defined in claim 29 wherein eight tuning forks are provided, four of said tuning forks having a common first axis, and the other four of said tuning forks having a common second axis, said first and second axes being disposed substantially equidistant from and parallel to an output shaft, said output shaft being disposed between two substantially fixed elements.

34. A gyroscope comprising:

a single crystal of piezoelectric material having a first portion comprising first and second tines which are driven along first and second paths, said first and second paths disposed in a common plane and a sensor mechanically connected to a second portion of said single crystal to piezoelectrically measure stresses caused in said second portion of said single crystal by rotation of said tines of said single crystal which forces said tines to move along a path other than said first path.

35. A gyroscope as defined in claim 34, wherein said tines comprise the tines of at least one tuning fork.

36. A gyroscope as defined in claim 35, wherein said tines are connected to said second portion, said second portion forming a common shaft, and wherein said sensor measures stresses in said common shaft.

37. A method of sensing rotation comprising the steps of:

vibrating the tines of a single, tuning fork-shaped crystal having piezoelectric properties in a first plane and sensing piezoelectric voltages generated by stresses within said vibrating single crystal resulting from the movement of said tines in directions orthogonal to said plane caused by the rotation of said single crystal.

38. A method of sensing rotation as defined in claim 37, wherein the step of vibrating the tines of a single, tuning-fork shaped crystal comprises the step of applying an oscillating voltage to said single crystal.

39. A method of sensing rotation of a gyroscope which includes a single crystal of piezoelectric material having at least first and second tines comprising a tuning fork with said two tines and a common shaft disposed in a plane, the method comprising the steps of:

electrically driving tines of said single crystal of piezoelectric material to move the tines of said single crystal along a first path; and piezoelectrically detecting stress in said single crystal caused by the tendency of said tines to continue moving along said first path, thereby detecting rotation of said single crystal of piezoelectric material.

40. A method of sensing rotation as defined in claim 39, wherein the step of electrically driving the piezoelectric material comprises the step of applying an oscillating voltage to the piezoelectric material.

41. A method of sensing rotation as defined in claim 39 wherein said step of electrically driving said tines comprises the step of driving said tines to cause them to vibrate at a drive frequency.

42. A method of sensing rotation as defined in claim 41, wherein said step of piezoelectrically detecting stress comprises the step of measuring piezoelectric voltages in said common shaft.

* * * * *